United States Patent Office 2,896,975
Patented July 28, 1959

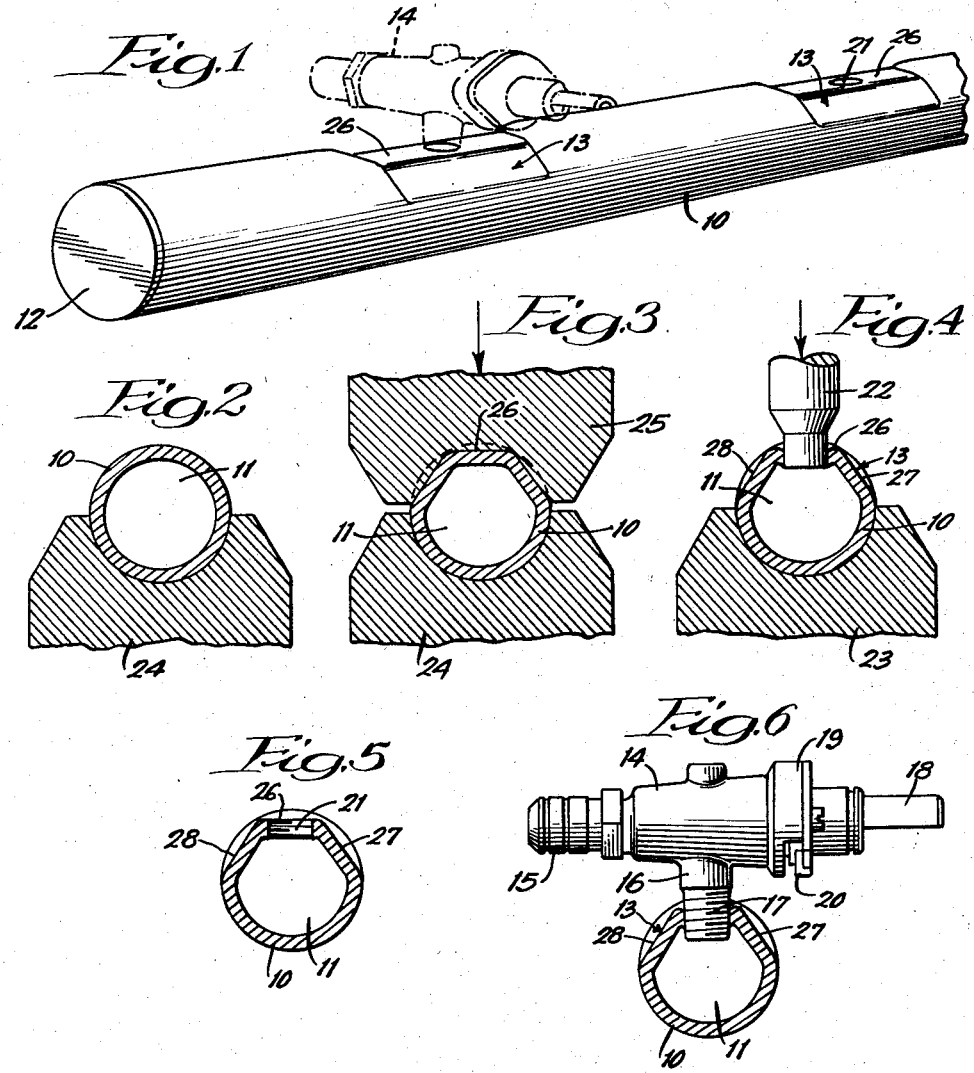

2,896,975

PIPE MANIFOLD AND METHOD OF MAKING

Ralph L. Wahl, Elgin, and Edward W. Schmecht, Chicago, Ill., assignors to Cribben and Sexton Company, Chicago, Ill., a corporation of Illinois Application October 19, 1955, Serial No. 541,462

5 Claims. (Cl. 285—219)

This invention relates to a pipe manifold and to a method of forming the same, and more particularly to a pipe manifold equipped at spaced apart points therealong with a plurality of valve-controlled outlets that are threadedly carried by the manifold. The structure is useful in gas ranges and in other environments where outlets which may be valve-controlled are threadedly received within openings carried by a manifold pipe.

Each gas range is provided with at least one burner, and generally with a plurality of burners. The burners are connected through a gaseous flow tube to a manifold that in turn is connected to a source of combustible gas. It is well known that a valve must be interposed between the manifold and burner, and the valves are customarily equipped with a handle that enables them to be manually manipulated for controlling the flow of gas from the manifold to the burners. It is customary to form the manifold and the control valves separately, and these two units are then assembled and are mounted within the gas range.

The customary manner for mounting the valve-controlled outlets on the manifold is to pierce the manifold at the desired points therealong and thread the openings formed by the piercing operation. Thereafter, the valve-controlled outlets, which are provided with threaded nipples, are screwed into the threaded openings in the manifold. A problem has been presented by this type of manifold structure in that the piercing operation causes a substantial area adjacent the pierced opening to be dished inwardly, thereby lowering the outer surface to a substantial distance below the corresponding surface of the pipe manifold. The dished-in portion of the pipe manifold presents two difficulties. The first is that the opening is not perfectly circular, and there are variations in the threads that make it difficult to screw a valve-controlled outlet thereinto. Secondly, the positioning of the valves is critical in that they must be located at the proper elevation to permit the handles to be connected thereto as well as the burners.

A difficulty has been presented in properly locating the valves in that the variations in the threads of the manifold openings frequently make it hard to provide a good gas-tight seal between the threads of the valve nipple and manifold opening. In addition, each valve is customarily provided with an enlarged collar or flange that frequently strikes the manifold pipe when the valve is rotated in screwing it into the manifold opening. The reason for this is that the dished-in portion of the manifold about the threaded openings therein initially position the valves at too low a point with respect to the remainder of the manifold, with the result that the enlarged collar of the valve strikes the upper surface of the manifold, which in effect is elevated with respect to the area about the threaded openings.

A need exists for an improved type of pipe manifold structure that will overcome the disadvantages present in the prior art structures, and it is accordingly an object of this invention to provide such an improved manifold structure. Another object of the invention is in the provision of a manifold structure that overcomes the disadvantages inherent in the prior art pipe manifolds without complicating the structural simplicity thereof and without appreciably altering the cost thereof.

Yet another object of the invention is in providing a pipe manifold adapted to threadedly receive one or more control valves or valve-controlled outlets therealong, and which has reinforced areas at the points where the valve-controlled outlets are connected thereto. A further object is in providing a reinforced pipe manifold of the character described wherein the reinforcing is accomplished by deforming the pipe conduit in a particular manner to increase the structural strength thereof.

Yet a further object is to provide a pipe manifold having a relatively flat top surface in a restricted area thereof that is substantially at the same elevation as the pipe surfaces adjacent thereto, and relatively flat side walls that are symmetrical and diverge outwardly therefrom to a diametric line drawn through the cylindrical pipe manifold. Still a further object is in providing a pipe manifold by deforming areas thereof in a die to structurally reinforce the same, thereafter piercing the manifold in the reinforced areas thereof to form openings therethrough, and subsequently forming threads in those openings, the manifold resulting therefrom having threaded openings that are substantially perfectly circular, and have uniform threads throughout and is not dished-in or collapsed in the areas thereof adjoining the threaded openings. Additional objects and advantages will become apparent as the specification develops.

An embodiment of the invention is illustrated in the accompanying drawing, in which—

Figure 1 is a broken perspective view of a manifold incorporating and made in accordance with the invention, and in which a valve-controlled outlet is shown by broken lines in position thereon; Figure 2 is a tranverse sectional view of the manifold showing the same in the first step of its manufacture; Figure 3 is a transverse sectional view similar to that of Figure 2, but showing the deforming die in position thereabout; Figure 4 is a further transverse sectional view showing the piercing operation; Figure 5 is a transverse sectional view showing the manifold following the step of threading the pierced openings therethrough; and Figure 6 is a transverse sectional view showing a valve-controlled outlet in operative position on the manifold.

Figure 1 illustrates a portion of a pipe manifold which is designated with the numeral 10. As is apparent from Figure 1 and from the remaining figures of the drawing, the manifold 10 is substantially cylindrical and is provided with a flow passage 11 extending longitudinally therethrough. One end of the pipe or manifold (which is not shown) is adapted to be connected to a source of combustible gas, and the other end thereof may be closed by a sealing closure plug 12. The manifold is adapted to be mounted within a gas range and is provided with a plurality of spaced apart points or areas, designated generally by the numeral 13, where valve-controlled outlets 14 are connected thereto and communicate with the flow passage 11.

The valve-controlled outlets 14 are substantially conventional and are of the character of those normally found in gas ranges. The structure 14 is provided with an outlet nipple 15 adapted to be connected to a burner (not shown) in the usual manner. The valve structure is also provided with an inlet nipple 16 that is threaded, as shown at 17, so as to be threadedly received within a complementary opening provided in the manifold 10. The structure 14 is also equipped with a valve stem 18 adapted to have a handle (not shown) mounted thereon so as to facilitate manual opening and closing of the valve to selectively open incrementally and close the flow passage through the structure between the inlet nipple 16 and outlet fitting 15. The valve-equipped outlet structure 14 is provided intermediate the ends thereof with an enlarged collar or flange 19 that provides the greatest transverse dimension of the structure. If desired, the flange 19 may incorporate a safety feature 20 that permits the stem 18 to be turned to "on" position only when the stem is depressed.

As is most clear from Figure 5, the manifold 10 is provided with a threaded opening 21 therethrough at each of the restricted areas 13. The threaded end portion 17 of the nipple 16 is adapted to be turned into the threaded aperture or opening 21. Generally, a sealing compound would be applied to the threads of the nipple prior to this operation so that when the valve-controlled outlet structure 14 is in position, the compound will harden to form a gas-tight seal between the threads of the opening 21 and threads of the nipple 16. In prior art structures, the area about each of the threaded openings 21 has been collapsed or dished inwardly to such an extent that rotation of the valve structure 14 with respect to the manifold causes the flange or collar 19 to scrape against and strike the normal or uncollapsed surface portions of the manifold. It will be apparent that such an arrangement makes it extremely difficult to position the structure 14 at the necessary elevation so that a burner can readily be connected to the burner 15 thereof, and so that the valve stem 18 aligns properly with and will extend through suitable openings for that purpose provided in the front panel of a gas range.

This collapsing has been brought about in a piercing operation wherein a piercing tool (such as the tool 22 shown in Figure 4) is pressed or forced through the manifold to form the openings therealong. Collapsing of the metal about the point of the piercing tool also causes a distortion in the shape of the pierced opening so that the opening is somewhat oval or oblong in shape, with the major axis of the oval extending longitudinally along the pipe. Thus, it is difficult to establish a proper seal between the threaded nipple and threaded opening through the manifold, variations in the threads through the openings often result, and it is difficult to initially start the threaded nipples into the threaded openings.

In the structure we have provided, the manifold 10 is reinforced in the areas 13 by deforming the same in those areas prior to the piercing operation. The deformation of the pipe structurally reinforces the same to such an extent that the wall of the pipe does not collapse when pierced.

In deforming the conduit to structurally reinforce the same, the first step is to position the conduit or manifold 10 in the jaw of a lower die member 24. Thereafter, the upper section 25 of the deforming die is brought downwardly against the conduit 10, as shown in Figure 3. The upper die section 25 has the form or configuration that it is desired to force into the conduit 10, and after the deforming operation the areas 13 will have the configuration shown most clearly in Figures 1, 5 and 6. Thereafter, the area that has been deformed and thereby reinforced will be pierced, as shown in Figure 4, and since the piercing operation has been described hereinbefore and is well known in the art, a further description thereof will not be set forth. The final step which follows the piercing operation is to thread the pierced openings or apertures, as shown in Figure 5, and since providing internal threads in an opening is old in the art, this operation will not be described in detail.

The deformed areas 13 extend longitudinally along the manifold 10 for limited distances, and they extend semi-circumferentially about the conduit. That is to say, as is most evident from Figure 5, the deformed areas encompass circumferentially about 180° of the cylindrical manifold 10. The areas comprise a top wall or surface 26 which is generally flat, and while located slightly below the adjacent surfaces of the manifold is substantially at the same elevation thereof. Inclined outwardly and downwardly from the flattened top wall 26 are the symmetrical side walls 27 and 28 which are substantially flat and extend at their lower ends to a diametric line extending transversely across the manifold. As is seen in Figure 5, the flattened, diverging side walls 27 and 28 extend to the horizontal diameter of the conduit. It has been found that the reinforcing of the conduit provided by the deformation is exceptionally good when the angle formed by the inclined walls 27 and 28 with the diametric line through the conduit, or the horizontal transverse axis in the Figure 5 illustration, is between 50° and 55°; and the inclined side walls and flattened top wall 26 give the conduit sufficient rigidity so that it does not collapse and dish inwardly during the piercing operation, as shown in Figure 4.

As a result, the pierced openings or apertures are almost perfectly circular in character, the threads formed within the openings are uniform throughout, and the threads 17 of the valve-controlled outlet of nipple 16 are readily started into the threads of the openings, and a proper seating and sealing therebetween at the desired elevation is readily accomplished. Furthermore, the enlarged collar or flange 19 of the valve-equipped outlet does not strike the manifold 10 when it is rotated relative thereto, with the result that the proper elevation of the outlet structure is readily attained.

While in the foregoing specification both the structural and method features of the invention have been set forth in considerable detail for purposes of disclosing the invention completely, it will be apparent to those skilled in the art that changes may be made in the details of both the structure and method features without departing from the spirit and principles of the invention.

We claim:

1. In a manifold for gas ranges and the like, a generally cylindrical pipe, said pipe being deformed in at least one substantially semi-circumferential area thereof to reinforce the same, the deformed area comprising a flat top wall and relatively flat side walls inclined downwardly and outwardly therefrom and terminating along a plane passing through the longitudinal axis of said pipe, said flat top wall having a circular opening therethrough threaded to receive a valve-equipped outlet structure.

2. In a manifold structure of the character described, a generally cylindrical pipe having a deformed area reinforcing the same, said deformed area extending longitudinally along said pipe for a limited distance and semi-circumferentially thereabout, said area comprising symmetrically disposed side walls flattened and converging from a diametric line to a substantially flat top wall portion, and said flat top wall portion being provided with an opening therethrough threaded to receive an outlet structure, said flat top wall portion having spaced side edges substantially aligned with the outer cylindrical surface of said pipe.

3. The manifold structure of claim 2 in which said symmetrically disposed side walls form an angle with the diametric line of from about 50° to 55°.

4. In a manifold structure of the character described, a generally cylindrical pipe having at least one deformed area reinforcing the same, said deformed area extending semi-circumferentially and longitudinally along said pipe for a relatively short distance, said area comprising symmetrically disposed and substantially flat side walls converging to a top wall portion, and said top wall portion being provided with an opening therethrough threaded to receive a valve-equipped outlet member and having spaced side edges substantially aligned with the outer cylindrical surface of said pipe.

5. A pipe adapted for use in a valve-equipped manifold structure, said pipe having at least one deformed area structurally reinforcing the same, said deformed area comprising a relatively flat top wall and substantially symmetrical side walls diverging downwardly and outwardly therefrom, said side walls being relatively flat and having lower edges terminating along a plane passing along the axis of said pipe, and said top wall forming with the remainder of said pipe a continuous surface having substantially the same elevation throughout, said top wall being provided with a threaded aperture therethrough.

References Cited in the file of this patent

UNITED STATES PATENTS

| | | |
|---|---|---|
| 2,000,334 | Kahn | May 7, 1935 |
| 2,092,170 | Kritzer et al. | Sept. 7, 1937 |
| 2,129,758 | Frey | Sept. 13, 1938 |
| 2,192,204 | Ferris | Mar. 12, 1940 |

FOREIGN PATENTS

| | | |
|---|---|---|
| 199,369 | Great Britain | May 14, 1923 |